United States Patent
Kim (10) Patent No.: US 12,330,718 B2
(45) Date of Patent: Jun. 17, 2025

(54) REAR WHEEL STEERING APPARATUS AND CONTROL METHOD THEREOF

(71) Applicant: HL MANDO CORPORATION, Pyeongtaek-si (KR)

(72) Inventor: Inhyun Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 209 days.

(21) Appl. No.: 18/205,143

(22) Filed: Jun. 2, 2023

(65) Prior Publication Data

US 2024/0239407 A1 Jul. 18, 2024

(30) Foreign Application Priority Data

Jan. 17, 2023 (KR) ........................ 10-2023-0006471

(51) Int. Cl.
| | |
|---|---|
| *B62D 5/04* | (2006.01) |
| *B62D 6/00* | (2006.01) |
| *B62D 7/15* | (2006.01) |
| *B62D 15/02* | (2006.01) |

(52) U.S. Cl.
CPC ......... *B62D 5/0472* (2013.01); *B62D 5/0481* (2013.01); *B62D 6/002* (2013.01); *B62D 7/159* (2013.01); *B62D 15/02* (2013.01); *B62D 15/0235* (2013.01); *B60Y 2400/84* (2013.01); *B62D 5/046* (2013.01); *B62D 7/1581* (2013.01)

(58) Field of Classification Search
None
See application file for complete search history.

(56) References Cited

U.S. PATENT DOCUMENTS

| | | | | |
|---|---|---|---|---|
| 5,274,555 A | * | 12/1993 | Fukunaga | B62D 7/159 |
| | | | | 701/42 |
| 5,386,365 A | * | 1/1995 | Nagaoka | B62D 7/159 |
| | | | | 701/44 |
| 5,502,639 A | * | 3/1996 | Fukunaga | B62D 7/159 |
| | | | | 701/41 |
| 8,731,778 B2 | * | 5/2014 | Kageyama | B62D 7/159 |
| | | | | 180/408 |
| 9,950,736 B2 | * | 4/2018 | Hwa | B62D 5/0463 |
| 9,988,044 B2 | * | 6/2018 | Varisco | B62D 6/003 |

(Continued)

FOREIGN PATENT DOCUMENTS

| | | | | |
|---|---|---|---|---|
| CN | 106248404 B | * | 7/2019 | ........... B62D 5/0409 |
| CN | 116654086 A | * | 8/2023 | |

(Continued)

OTHER PUBLICATIONS

Office Action dated Oct. 10, 2024 for corresponding German Patent Application No. 10 2023 116 972.6, along with an English translation (10 pages).

*Primary Examiner* — Kevin R Steckbauer
(74) *Attorney, Agent, or Firm* — Hauptman Ham, LLP (57) ABSTRACT

The present disclosure relates to a rear wheel steering apparatus and a control method thereof, which can detect stick-slip that may occur during the operation of a rear wheel steering (RWS) system, thereby controlling the performance of a motor in a variable manner, and can control the motor to operate in a limited operation mode only when the stick-slip has occurred during the operation of the RWS system, thereby reducing the noise generated by the stick-slip and the shock transmitted to a vehicle.

26 Claims, 10 Drawing Sheets

(56) References Cited

U.S. PATENT DOCUMENTS

| | | | | |
|---|---|---|---|---|
| 10,308,281 | B2* | 6/2019 | Muller | B62D 5/0463 |
| 10,604,182 | B2* | 3/2020 | Kim | B62D 7/159 |
| 2011/0144864 | A1* | 6/2011 | Kageyama | B62D 7/1581 |
| | | | | 701/41 |
| 2016/0362130 | A1* | 12/2016 | Hwa | B62D 5/0421 |
| 2017/0101088 | A1* | 4/2017 | Varisco | B60W 10/20 |
| 2017/0361871 | A1* | 12/2017 | Muller | B62D 5/0463 |
| 2018/0065662 | A1* | 3/2018 | Kim | B62D 7/159 |
| 2018/0237056 | A1* | 8/2018 | Bremkens | G01L 5/0042 |
| 2020/0298907 | A1* | 9/2020 | Lim | B62D 15/021 |
| 2023/0106423 | A1* | 4/2023 | Wang | B62D 7/226 |
| | | | | 180/445 |
| 2024/0067265 | A1* | 2/2024 | Dasch | B62D 6/02 |
| 2024/0067266 | A1* | 2/2024 | Dasch | B62D 7/159 |
| 2024/0239407 | A1* | 7/2024 | Kim | B62D 7/159 |

FOREIGN PATENT DOCUMENTS

| | | | | |
|---|---|---|---|---|
| DE | 102007014344 A1 * | 10/2008 | | B60T 17/221 |
| DE | 102014202230 A1 * | 8/2015 | | B60W 10/184 |
| DE | 102014113614 B3 * | 9/2015 | | B62D 5/0481 |
| DE | 102014118567 A1 * | 6/2016 | | B62D 5/0463 |
| DE | 102014118567 B4 * | 8/2016 | | B62D 5/0463 |
| DE | 102016100980 A1 * | 7/2017 | | B62D 5/046 |
| DE | 102016100980 B4 * | 8/2018 | | B62D 5/046 |
| DE | 102013220520 B4 * | 12/2018 | | B62D 5/0448 |
| DE | 102021200369 B3 * | 5/2022 | | B62D 6/002 |
| DE | 102021200370 A1 * | 7/2022 | | B62D 7/159 |
| DE | 102022116883 A1 * | 1/2023 | | B62D 5/0481 |
| DE | 102021210368 A1 * | 3/2023 | | B62D 5/0445 |
| EP | 2139747 B1 * | 6/2011 | | B60T 17/221 |
| EP | 3153382 A1 * | 4/2017 | | B60W 10/16 |
| EP | 3230152 B1 * | 3/2019 | | B62D 5/0463 |
| EP | 3153382 B1 * | 5/2020 | | B60W 10/16 |
| FR | 3125003 A1 * | 1/2023 | | B62D 5/0481 |
| JP | 3690311 B2 * | 8/2005 | | B62D 6/00 |
| JP | 6229821 B2 * | 11/2017 | | B62D 5/0463 |
| JP | 2023010646 A * | 1/2023 | | B62D 5/0481 |
| JP | 7219363 B2 * | 2/2023 | | B62D 5/0481 |
| WO | WO-2008116555 A1 * | 10/2008 | | B60T 17/221 |
| WO | WO-2016091866 A1 * | 6/2016 | | B62D 5/0463 |
| WO | WO-2017014228 A1 * | 1/2017 | | B62D 5/0463 |
| WO | WO-2017125192 A1 * | 7/2017 | | B62D 5/046 |
| WO | WO-2022152416 A1 * | 7/2022 | | B62D 6/002 |

\* cited by examiner

REAR WHEEL STEERING APPARATUS AND CONTROL METHOD THEREOF

CROSS-REFERENCE TO RELATED APPLICATION

This application claims the benefit of priority to Korean Patent Application No. 10-2023-0006471, filed on Jan. 17, 2023 in the Korean Intellectual Property Office, the entire content of which is incorporated herein by reference.

TECHNICAL FIELD

The present disclosure relates to a rear wheel steering apparatus and a control method thereof, and more particularly, to an apparatus for controlling the operation of a rear wheel steering (RWS) system and a control method thereof.

BACKGROUND

During the development and production of rear wheel steering (RWS) systems, a failure rate of approximately 1% to 2% occurs due to a hardware stick-slip phenomenon. Due to the occurrence of stick-slip, a vehicle generates a level of noise that is noticeable to vehicle occupants. Therefore, conventionally, the control performance of the RWS system was uniformly lowered at a specific speed of the vehicle, regardless of the occurrence of stick-slip, in order to artificially weaken the stick-slip phenomenon, thereby reducing noise to a level that is not noticeable to the vehicle occupants. However, there is a problem where the control performance of the RWS system is uniformly lowered at a specific vehicle speed for all products, without distinguishing between the products with good quality and the defective products.

SUMMARY

An object of the present disclosure is to provide a rear wheel steering apparatus and a control method thereof, which can detect stick-slip that may occur during the operation of a rear wheel steering (RWS) system.

Another object of the present disclosure is to provide a rear wheel steering apparatus and a control method thereof, which can control a motor to operate in a limited operation mode in the event of stick-slip during the operation of the RWS system.

Other objects not specified in the present disclosure may be further considered within the scope that can easily be inferred from the following detailed description and effects thereof.

A rear wheel steering apparatus according to one exemplary embodiment of the present disclosure for achieving the above-mentioned object may be configured to control a steering angle of rear wheels based on a command received from a vehicle electronic control unit (ECU), the rear wheel steering apparatus comprising: a motor for moving a rear wheel steering rail connected to the rear wheels in the left and right directions; and a rear wheel steering ECU for controlling the motor to move the rear wheel steering rail to a target movement distance based on the command and determining whether stick-slip occurs based on the target movement distance and an actual movement distance of the rear wheel steering rail.

The rear wheel steering apparatus may further comprise a linear position sensor for sensing the actual movement distance of the rear wheel steering rail, and the rear wheel steering ECU may receive the actual movement distance from the linear position sensor.

The rear wheel steering ECU may determine that the stick-slip has occurred in response to determining that a first condition, in which a difference between the target movement distance and the actual movement distance occurring for a predetermined unit time is equal to or greater than a first predetermined reference distance, is satisfied.

The rear wheel steering ECU may determine whether the stick-slip occurs by further using at least one of an estimated movement distance obtained based on a rotation angle of the motor or a current output of the motor.

The rear wheel steering apparatus may further comprise a motor position sensor for sensing the rotation angle of the motor, and the rear wheel steering ECU may receive the rotation angle from the motor position sensor and obtain the estimated movement distance of the rear wheel rail based on the rotation angle.

In a state where the first condition is satisfied, the rear wheel steering ECU may determine that the stick-slip has occurred in response to determining that at least one of a second condition, in which the current output of the motor is equal to or greater than a predetermined reference output when the actual movement distance for the unit time reaches a second predetermined reference distance or more at one go, or a third condition, in which a difference between the estimated movement distance and the actual movement distance is equal to or greater than a third predetermined distance, is satisfied.

The rear wheel steering ECU may sequentially determine whether the first condition, the second condition, and the third condition are satisfied according to a predetermined sequence, determine that the stick-slip has occurred in response to determining that all the first condition, the second condition, and the third condition are satisfied, and determine that the stick-slip has not occurred in response to determining that any one of the first condition, the second condition, and the third condition is not satisfied.

In response to determining that the stick-slip has occurred, the rear wheel steering ECU may control the motor to operate in a limited operation mode.

The rear wheel steering ECU may control the motor to operate in the limited operation mode in which the rear wheel steering rail moves by a limited movement distance obtained using a predetermined limit ratio based on the target movement distance.

The rear wheel steering ECU may control the motor to operate in the limited operation mode having different limit ratios depending on a level of the stick-slip that has occurred.

In response to determining that the level of the stick-slip is within a first stick-slip level, at which only one of the second condition and the third condition is satisfied in a state where the first condition is satisfied, the rear wheel steering ECU may control the motor to operate in the limited operation mode in which the rear wheel steering rail moves by a first limited movement distance obtained based on the target movement distance using a first predetermined limit ratio. In response to determining that the level of the stick-slip is equal to a second stick-slip level, at which all the first condition, the second condition, and the third condition are satisfied, the rear wheel steering ECU may control the motor to operate in the limited operation mode in which the rear wheel steering rail moves by a second limited movement distance obtained based on the target movement distance using a second predetermined limit ratio having a value lower than the first limit ratio.

The rear wheel steering ECU may perform an operation of determining whether the stick-slip occurs and an operation of controlling the motor to operate in the limited operation mode only once at a beginning of an operation of the rear wheel steering apparatus or continuously perform the operation of determining whether the stick-slip occurs and the operation of controlling the motor to operate in the limited operation mode during the operation of the rear wheel steering apparatus.

A control method of a rear wheel steering apparatus according to another exemplary embodiment of the present disclosure is provided to achieve the above-mentioned object, the rear wheel steering apparatus configured to control a steering angle of rear wheels based on a command received from a vehicle electronic control unit (ECU) and comprising: a motor for moving a rear wheel steering rail connected to the rear wheels in the left and right directions; and a rear wheel steering ECU for controlling the motor to move the rear wheel steering rail to a target movement distance based on the command, the control method comprising determining, by the rear wheel steering ECU, whether stick-slip occurs based on the target movement distance and an actual movement distance of the rear wheel steering rail.

The determining whether the stick-slip occurs may comprise determining whether the stick-slip occurs based on the actual movement distance received from a linear position sensor.

The determining whether the stick-slip occurs may comprise determining that the stick-slip has occurred in response to determining that a first condition, in which a difference between the target movement distance and the actual movement distance occurring for a predetermined unit time is equal to or greater than a first predetermined reference distance, is satisfied.

The determining whether the stick-slip occurs may comprise determining whether the stick-slip occurs by further using at least one of an estimated movement distance obtained based on a rotation angle of the motor or a current output of the motor.

The determining whether the stick-slip occurs may comprise obtaining the estimated movement distance of the rear wheel steering rail based on the rotation angle received from a motor position sensor.

The determining whether the stick-slip occurs may comprise determining that the stick-slip has occurred, in a state where the first condition is satisfied, in response to determining that at least one of a second condition, in which the current output of the motor is equal to or greater than a predetermined reference output when the actual movement distance for the unit time reaches a second predetermined reference distance or more at one go, or a third condition, in which a difference between the estimated movement distance and the actual movement distance is equal to or greater than a third predetermined distance, is satisfied.

The determining whether the stick-slip occurs may comprise sequentially determining whether the first condition, the second condition, and the third condition are satisfied according to a predetermined sequence, determining that the stick-slip occurs in response to determining that all the first condition, the second condition, and the third condition are satisfied, and determining that the stick-slip has not occurred in response to determining that any one of the first condition, the second condition, and the third condition is not satisfied.

The method may further comprise controlling, by the rear wheel steering ECU, the motor to operate in a limited operation mode in response to determining that the stick-slip has occurred.

A rear wheel steering apparatus according to still another exemplary embodiment of the present disclosure for achieving the above-mentioned object may be configured to control a steering angle of rear wheels based on a command received from a vehicle electronic control unit (ECU), the rear wheel steering apparatus comprising: a motor for moving a rear wheel steering rail connected to the rear wheels in the left and right directions; and a rear wheel steering ECU for determining whether stick-slip occurs based on the target movement distance and an actual movement distance of the rear wheel steering rail and controlling the motor to operate in a limited operation mode, in which the rear wheel steering rail moves by a limited movement distance smaller than the target movement distance, in response to determining that the stick-slip has occurred.

The rear wheel steering ECU may control the motor to operate in a normal operation mode, in which the rear wheel steering rail moves by the target movement distance based on the command received from the vehicle ECU, in response to determining that the stick-slip has not occurred.

The limited movement distance may be determined by the target movement distance multiplied by a predetermined limit ratio.

The rear wheel steering ECU may control the motor to operate in the limited operation mode having different limit ratios depending on a level of the stick-slip that has occurred.

According to the rear wheel steering apparatus and the control method thereof according to various exemplary embodiments of the present disclosure, it is possible to detect stick-slip that may occur during the operation of the RWS system, thereby controlling the performance of the motor in a variable manner.

Moreover, it is possible to control the motor to operate in a limited operation mode only when the stick-slip has occurred during the operation of the RWS system, thereby reducing the noise generated by the stick-slip and the shock transmitted to the vehicle.

The effects of the present disclosure are not limited to those mentioned above, and other effects not mentioned will be clearly understood by those skilled in the art from the description below.

DETAILED DESCRIPTION

Hereinafter, embodiments of the present disclosure will be described in detail with reference to the accompanying drawings. Advantages and features of the present disclosure, and methods for achieving them, will become apparent with reference to the following embodiments in conjunction with the accompanying drawings. However, the present disclosure is not limited to the embodiments disclosed below and may be implemented in various different forms. The embodiments are provided only to complete the present disclosure and to allow those skilled in the art to which the present disclosure pertains to fully understand the scope of the present disclosure, and the present disclosure is defined only by the appended claims. The same reference numerals numbers designate the same components throughout the specification.

Unless otherwise defined, all terms (including technical and scientific terms) used herein may has the same meaning as those commonly understood by those of ordinary skill in the art to which the present disclosure pertains. In addition, terms defined in commonly used dictionaries are not interpreted ideally or excessively unless explicitly specifically defined.

In this specification, the terms such as "first", "second", or the like are used to distinguish one component from other components, and the scope of rights should not be limited by these terms. For example, a first component may be referred to as a second component, and similarly, the second component may be referred to as the first component.

As used herein, the reference characters (for example, a, b, c, etc.) in each step are used for convenience of description, and are not intended to describe the sequence of the steps. The steps may occur in different sequences, as long as a specific sequence is not specifically described in the context. That is, the steps may occur in the same order as specified, may be performed simultaneously, or may be performed in the reverse order.

The terms such as "have", "may have", "include" and "may include" as used herein indicate the existence of corresponding features (for example, elements such as numerical values, functions, operations, or parts) and do not preclude the presence of additional features.

Moreover, the term "unit" as used herein (e.g., a vehicle electronic control unit or a rear wheel steering electronic control unit) refers to a software or hardware component such as a field programmable gate array (FPGA) or an application-specific integrated circuit (ASIC), and the "unit" performs certain roles. However, the "unit" is not limited to software or hardware. The "unit" may be configured to be stored in an addressable storage medium, or to execute one or more processors (e.g., computer, microprocessor, CPU, ASIC, circuitry, logic circuits, etc.). For example, the "unit" may include components, such as software components, object-oriented software components, class components and task components, processes, functions, attributes, procedures, subroutines, segments of program codes, drivers, firmware, microcodes, circuits, data structures, and variables. The functions provided in the components and "units" may be combined into fewer components and "units", or further divided into more components and "units".

Hereinafter, various exemplary embodiments of a rear wheel steering apparatus and a control method thereof according to the present disclosure will be described in detail with reference to the accompanying drawings.

First, a rear wheel steering apparatus according to one exemplary embodiment of the present disclosure will be described with reference to FIGS. 1 to 3.

Figure 1:
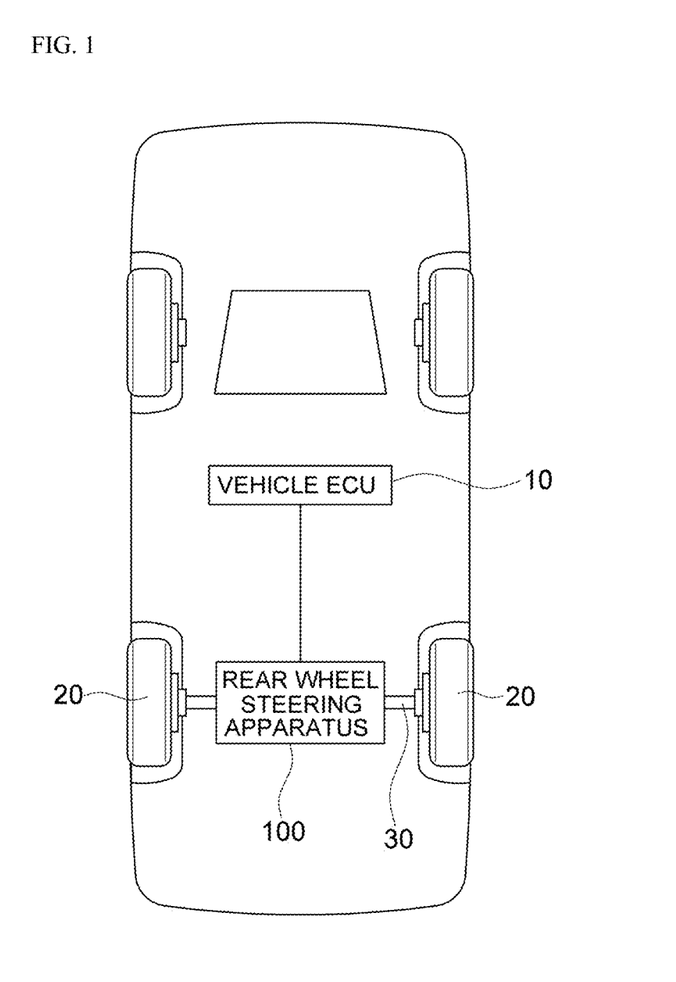
FIG. 1 is a block diagram illustrating a rear wheel steering apparatus according to one exemplary embodiment of the present disclosure.
Figure 2:
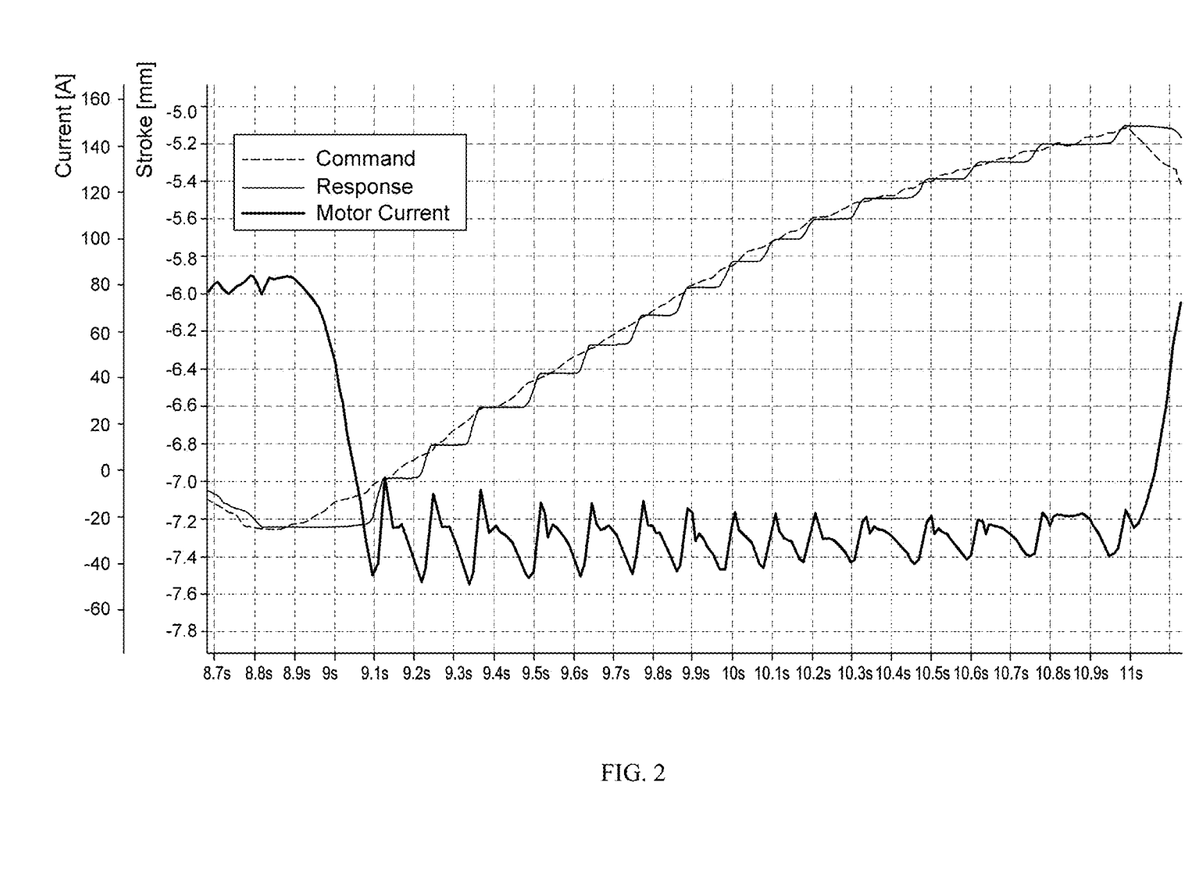
FIG. 2 is a diagram illustrating a first basis for determining whether stick-slip occurs according to one exemplary embodiment of the present disclosure.
Figure 3:
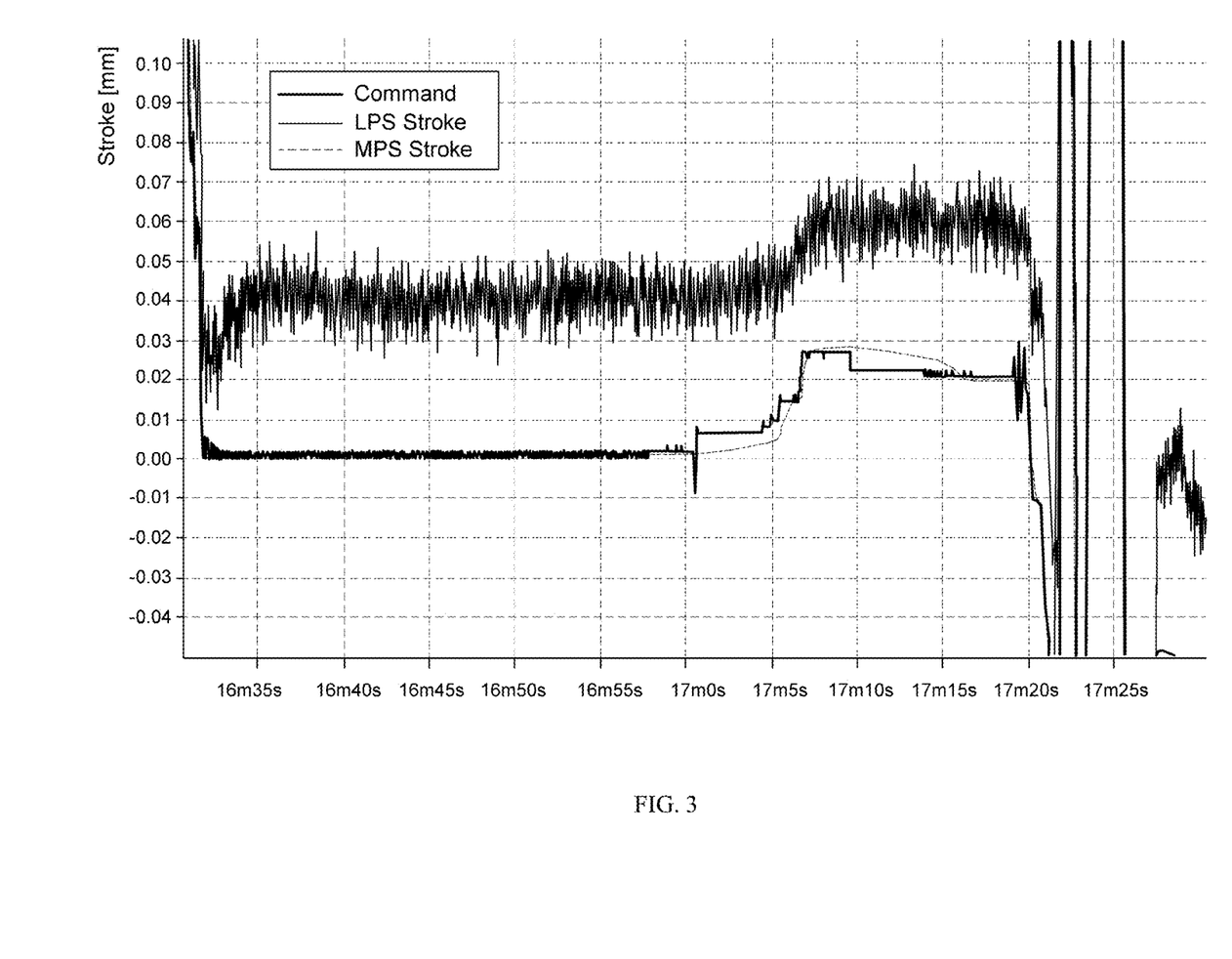
FIG. 3 is a diagram illustrating a second basis for determining whether stick-slip occurs according to one exemplary embodiment of the present disclosure.

FIG. 1 is a block diagram illustrating a rear wheel steering apparatus according to one exemplary embodiment of the present disclosure, FIG. 2 is a block diagram illustrating a first basis for determining whether stick-slip occurs according to one exemplary embodiment of the present disclosure, and FIG. 3 is a diagram illustrating a second basis for determining whether stick-slip occurs according to one exemplary embodiment of the present disclosure.

Referring to FIG. 1, a rear wheel steering apparatus 100 according to one exemplary embodiment of the present disclosure may be configured to control a steering angle of rear wheels 20 by moving a rear wheel steering rail 30 by means of a motor based on a command received from a vehicle electronic control unit (ECU) 10.

At this time, the rear wheel steering apparatus 100 may detect stick-slip that may occur during the operation of a rear wheel steering (RWS) system. Accordingly, the rear wheel steering apparatus 100 may control the performance of the motor in a variable manner depending on the occurrence of stick-slip.

Moreover, the rear wheel steering apparatus 100 may control the motor to operate in a limited operation mode only when the stick-slip has occurred during the operation of the RWS system. Accordingly, the rear wheel steering apparatus 100 can reduce the noise generated by the stick-slip and the shock transmitted to the vehicle.

That is, conventionally, the control performance of the RWS system was uniformly lowered at a specific vehicle speed (e.g., 10 kph), regardless of the occurrence of stick-slip. On the contrary, according to the present disclosure, it is possible to detect the occurrence of stick-slip by monitoring variables associated with the stick-slip and select whether to limit the control performance of the RWS system in a variable manner depending on the detection results. Accordingly, according to the present disclosure, it is possible to preemptively prevent field claims that may occur due to the occurrence of stick-slip, while maintaining the overall performance of the RWS system, thereby minimizing the possibility of incurring quality costs.

More specifically, in the event of stick-slip, as shown in FIG. 2, the rear wheel steering rail 30 moves about 0.15 mm to 0.2 mm at a time for each stroke (i.e., suddenly moves after not moving for a while), and the current output of the motor is about 20 A to 40 A at a time.

Moreover, in the event of stick-slip, as shown in FIG. 3, the MPS stroke calculated based on a measured value of a motor position sensor (MPS) follows the stroke according to a command well, but the LPS stroke measured through a linear position sensor (LPS) is different from the MPS stroke.

That is, according to the present disclosure, with reference to the following phenomena that occur due to stick-slip, it is possible to determine whether stick-slip occurs and control the performance of the motor depending on the determination results in a variable manner:

Unable to move finely and moving to a certain degree (in millimeters) at a time;

Starting to move only when a certain level of motor output is generated; and

Increased difference between the LPS stroke obtained by sensing the actual position of hardware and the MPS stroke calculated based on the measured value of the motor position sensor (MPS)

Next, the rear wheel steering apparatus according to one exemplary embodiment of the present disclosure will be described in more detail with reference to FIG. 4.

Figure 4:
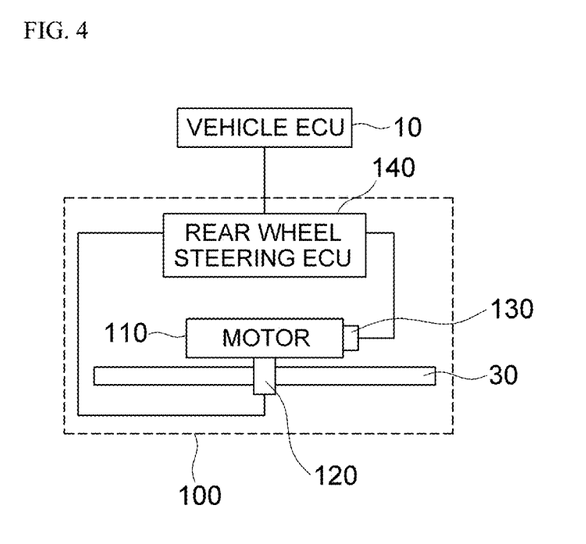
FIG. 4 is a diagram illustrating the details of the rear wheel steering apparatus as shown in FIG. 1.

FIG. 4 is a diagram illustrating the details of the rear wheel steering apparatus as shown in FIG. 1.

Referring to FIG. 4, the rear wheel steering apparatus 100 may comprise a motor 110, a linear position sensor (LPS) 120, a motor position sensor (MPS) 130, and a rear wheel steering ECU 140.

The motor 110 may move the rear wheel steering rail 30 connected to the rear wheels 20 of the vehicle in the left and right directions under the control of the rear wheel steering ECU 140.

The linear position sensor (LPS) 120 may sense an actual movement distance of the rear wheel steering rail 30.

The motor position sensor (MPS) 130 may sense a rotation angle of the motor 110.

The rear wheel steering ECU 140 may control the motor 110 to move the rear wheel steering rail 30 to a target movement distance based on a command received from the vehicle ECU 10.

In particular, the rear wheel steering ECU 140 according to the present disclosure may determine whether stick-slip occurs based on the target movement distance and the actual movement distance of the rear wheel steering rail 30.

Here, the rear wheel steering ECU 140 may receive the actual movement distance of the rear wheel steering rail 30 from the linear position sensor (LPS) 120.

That is, the rear wheel steering ECU 140 may determine that the stick-slip has occurred if a first condition is satisfied. On the contrary, if the first condition is not satisfied, the rear wheel steering ECU 140 may determine that the stick-slip has not occurred.

Here, the first condition refers to a condition in which a difference between the target movement distance and the actual movement distance occurring for a predetermined unit time is equal to or greater than a first predetermined reference distance. For example, the first condition may be a condition in which a difference between the target movement distance and the actual movement distance occurring for a unit time of "10 ms" is greater than or equal to a first reference distance of "0.1 mm". Of course, the predetermined unit time and first reference distance refer to threshold values obtained from previous tests and are tunable values.

Meanwhile, the rear wheel steering ECU 140 may also determine whether stick-slip occurs by further using at least one of an estimated movement distance obtained based on the rotation angle of the motor 110 or a current output of the motor 110.

The rear wheel steering ECU 140 may receive the rotation angle from the motor position sensor (MPS) 130 and obtain the estimated movement distance of the rear wheel steering rail 30 based on the received rotation angle.

That is, in a state where the first condition is satisfied, if at least one of a second condition or a third condition is satisfied, the rear wheel steering ECU 140 may determine that the stick-slip has occurred. On the contrary, in a state where the first condition is satisfied, if both the second condition and the third condition are not satisfied, the rear wheel steering ECU 140 may determine that that the stick-slip has not occurred.

Here, the second condition refers to a condition in which the current output of the motor 110 is equal to or greater than a predetermined reference output when the actual movement distance for the predetermined unit time reaches a second predetermined reference distance or more at one go. For example, the second condition may be a condition in which the current output of the motor is equal to or greater than a reference output of "20 A" when the actual movement distance for a unit time of "10 ms" is equal to or greater than a second reference distance of "0.2 mm" at one go. Of course, the predetermined unit time and second reference distance refer to threshold values obtained from previous tests and are tunable values.

The third condition refers to a condition in which a difference between the estimated movement distance and the actual movement distance is greater than or equal to a third predetermined reference distance. For example, the third condition may be a condition in which a difference between the estimated movement distance and the actual movement distance is greater than or equal to a third reference distance of "0.03 mm". Of course, the predetermined third reference distance refers to a threshold value obtained from previous tests and is a tunable value.

Meanwhile, the rear wheel steering ECU 140 may also sequentially determine whether the first condition, the second condition, and the third condition are satisfied according to a predetermined sequence. As a result of the determination, if all the first condition, the second condition, and the third condition are satisfied, the rear wheel steering ECU 140 may determine that the stick-slip has not occurred. On the contrary, if any one of the first condition, the second condition, and the third condition is not satisfied, the rear wheel steering ECU 140 may determine that the stick-slip has not occurred. For example, the rear wheel steering ECU 140 may determine whether the conditions are satisfied according to a predetermined sequence of "the first condition", "the second condition", "the third condition", "the first condition", "the third condition", and "the second condition", for example. Then, the rear wheel steering ECU 140 may determine that the stick-slip has occurred if all three conditions are satisfied and determine that the stick-slip has not occurred if any one condition is not satisfied in the sequential determination without having to determine whether other conditions are satisfied.

Moreover, the rear wheel steering ECU 140 may control the motor 110 to operate in a limited operation mode if it is determined that the stick-slip has occurred. On the contrary, the rear wheel steering ECU 140 may control the motor 110 to operate in a normal operation mode if it is determined that the stick-slip has not occurred.

Here, the limit operation mode refers to an operation mode in which the control performance is lowered to reduce the noise generated by stick-slip, such that the rear wheel steering rail 30 moves by a limited movement distance obtained based on a target movement distance using a predetermined limit ratio based on a command received from the vehicle ECU 10. For example, the limited movement distance may be an operation mode in which the rear wheel steering rail 30 moves by a limited movement distance of "5 mm" obtained using a limit ratio of "50%" based on a target movement distance of "10 mm".

The normal operation mode refers to an operation mode with a normal control performance in which the rear wheel steering rail 30 moves by a target movement distance based on a command received from the vehicle ECU 10. For example, the normal operation mode may be an operation mode in which the rear wheel steering rail 30 moves by a target movement distance of "10 mm".

At this time, the rear wheel steering ECU 140 may control the motor 110 to operate in a limited operation mode having different limit ratios depending on the level of stick-slip that has occurred.

That is, if the level of stick-slip that has occurred is within a first stick-slip level, the rear wheel steering ECU 140 may control the motor 110 to operate in a limited operation mode in which the rear wheel steering rail 30 moves by a first limited movement distance obtained based on the target movement distance using a first predetermined limit ratio.

Here, the first stick-slip level refers to a state where only one of the second condition and the third condition is satisfied in a state where the first condition is satisfied.

For example, the limited operation mode of the first stick-slip level may be an operation mode in which the rear wheel steering rail 30 moves by a first limited movement distance of "6 mm" obtained based on a target movement distance of "10 mm" using a first limit ratio of "60%".

On the contrary, if the level of stick-slip that has occurred is within a second stick-slip level, the rear wheel steering ECU 140 may control the motor 110 to operate in a limited operation mode in which the rear wheel steering rail 30 moves by a second limited movement distance obtained based on the target movement distance using a second predetermined limit ratio having a value lower than the first limit ratio.

Here, the second stick-slip level refers to a state where all the first condition, the second condition, and the third condition are satisfied.

For example, the limited operation mode of the second stick-slip level may be an operation mode in which the rear wheel steering rail 30 moves by a second limited movement distance of "2 mm" obtained based on a target movement distance of "10 mm" using a second limit ratio of "20%" having a value lower than a first limit ratio of "60%".

At this time, the rear wheel steering ECU 140 may perform a stick-slip detection operation (including the operation of determining whether stick-slip occurs and the operation of controlling the motor to operate in either a limited operation mode or a normal operation mode) only once at the beginning of the operation of the rear wheel steering apparatus 100 or continuously perform the operation during the operation of the rear wheel steering apparatus 100.

Next, a control method of a rear wheel steering apparatus according to one exemplary embodiment of the present disclosure will be described with reference to FIGS. 5 to 10.

Figure 5:
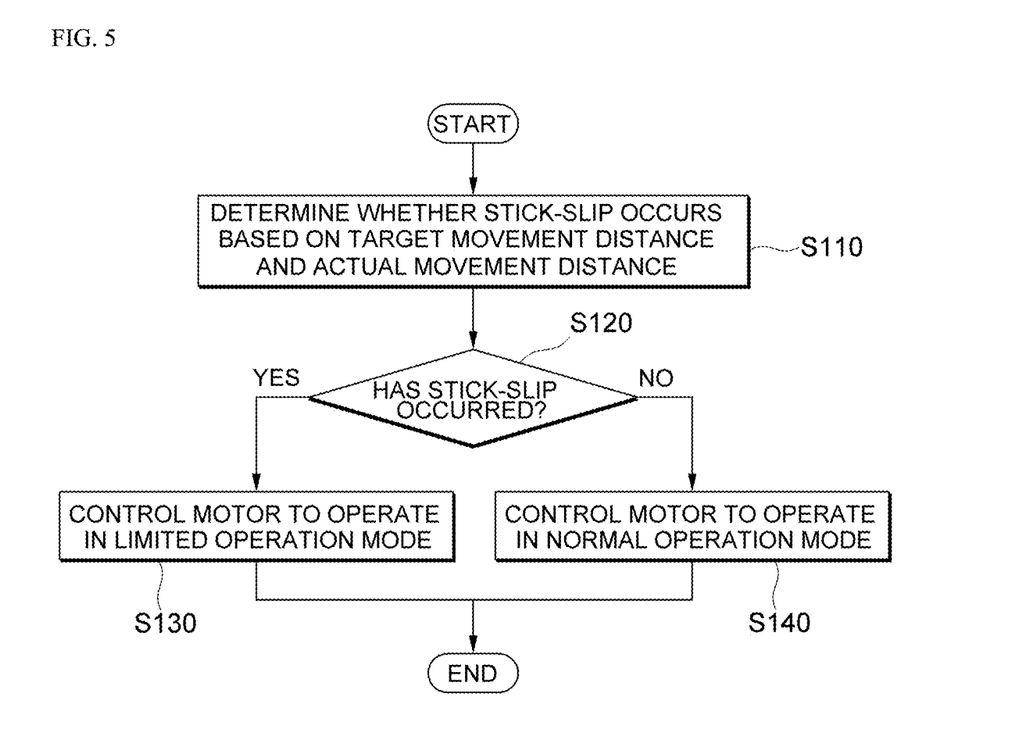
FIG. 5 is a flowchart illustrating a control method of a rear wheel steering apparatus according to one exemplary embodiment of the present disclosure.

FIG. 5 is a flowchart illustrating a control method of a rear wheel steering apparatus according to one exemplary embodiment of the present disclosure.

Referring to FIG. 5, the rear wheel steering ECU 140 of the rear wheel steering apparatus 100 may determine whether stick-slip occurs based on the target movement distance and the actual movement distance (S110).

That is, the rear wheel steering ECU 140 may determine that the stick-slip has occurred if the first condition is satisfied. On the contrary, the rear wheel steering ECU 140 may determine that the stick-slip has not occurred if the first condition is not satisfied.

Moreover, the rear wheel steering ECU 140 may also determine whether stick-slip occurs by further using at least one of an estimated movement distance obtained based on the rotation angle of the motor 10 or a current output of the motor 10. That is, the rear wheel steering ECU 140 may determine that the stick-slip has occurred if at least one of the second condition or the third condition is satisfied in a state where the first condition is satisfied. On the contrary, if both the second condition and the third condition are not satisfied in a state where the first condition is satisfied, the rear wheel steering ECU 140 may determine that the stick-slip has not occurred.

Meanwhile, the rear wheel steering ECU 140 may sequentially determine whether the first condition, the second condition, and the third condition are satisfied according to a predetermined sequence. As a result of the determination, if all the first condition, the second condition, and the third condition are satisfied, the rear wheel steering ECU 140 may determine that the stick-slip has occurred. On the contrary, if any one of the first condition, the second condition, and the third condition is not satisfied, the rear wheel steering ECU 140 may determine that the stick-slip has not occurred.

As a result of the determination, if it is determined that the stick-slip has occurred (S120-Y), the rear wheel steering ECU 140 may control the motor 110 to operate in a limited operation mode (S130).

On the contrary, if it is determined that the stick-slip has not occurred (S120-N), the rear wheel steering ECU 140 may control the motor 110 to operate in a normal operation mode.

Figure 6:
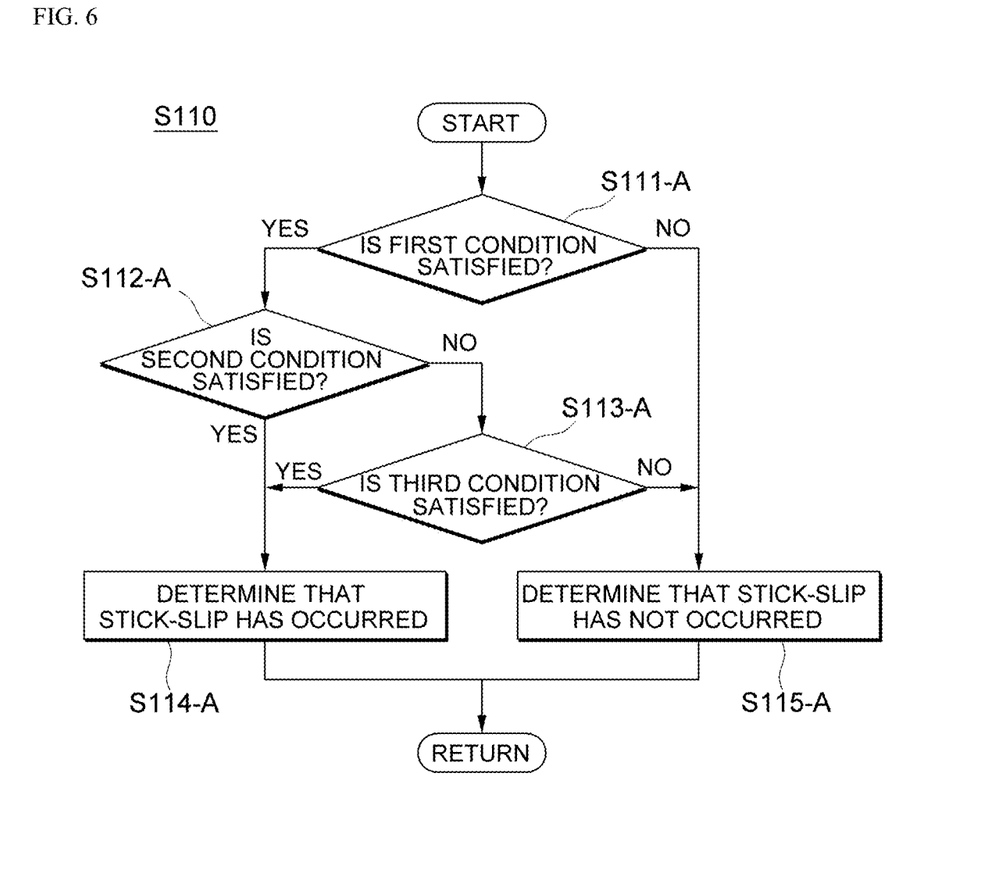
FIG. 6 is a flowchart illustrating an example of determining whether stick-slip occurs as shown in FIG. 5.
Figure 7:
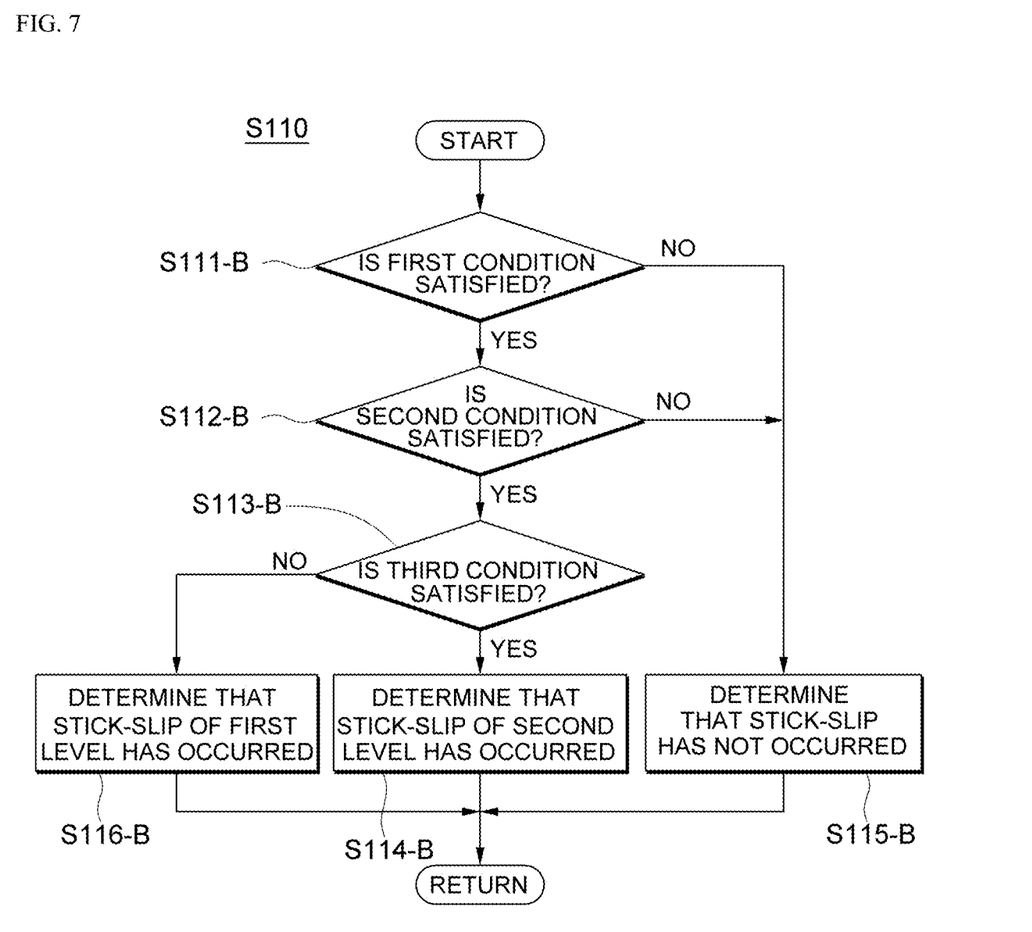
FIG. 7 is a flowchart illustrating another example of determining whether stick-slip occurs as shown in FIG. 5.

FIG. 6 is a flowchart illustrating an example of determining whether stick-slip occurs as shown in FIG. 5, and FIG. 7 is a flowchart illustrating another example of determining whether stick-slip occurs as shown in FIG. 5.

A first embodiment of determining whether stick-slip occurs will be described with reference to FIG. 6. If the first condition is satisfied (S111-A-Y) and the second condition is satisfied (S112-A-Y), or if the first condition is satisfied (S111-A-Y), the second condition is not satisfied (S112-A-N), and the third condition is satisfied (S113-A-Y), the rear wheel steering ECU 140 may determine that the stick-slip has occurred (S114-A).

On the contrary, if the first condition is not satisfied (S111-A-N), or if the first condition is satisfied (S111-A-Y), the second condition is not satisfied (S112-A-N), and the third condition is not satisfied (S113-A-N), the rear wheel steering ECU 140 may determine that the stick-slip has not occurred (S115-A).

Meanwhile, although it is shown in FIG. 6 to first determine whether the second condition is satisfied and then determine whether the third condition is satisfied, it is just one example, and according to embodiments, it is possible to first determine whether the third condition is satisfied, and then determine whether the second condition is satisfied.

A second embodiment of determining whether stick-slip occurs will be described with reference to FIG. 7. If the first condition is satisfied (S111-B-Y), the second condition is satisfied (S112-B-Y), and the third condition is satisfied (S113-B-Y), the rear wheel steering ECU 140 may determine that stick-slip of a second level has occurred (S114-B).

On the contrary, if the first condition is not satisfied (S111-B-N), if the first condition is satisfied (S111-B-Y) and the second condition is not satisfied (S112-B-N), or if the first condition is satisfied (S111-B-Y), the second condition is satisfied (S112-B-Y), and the third condition is not satisfied (S113-B-N), the rear wheel steering ECU 140 may determine that stick-slip of a first level has occurred (S116-B).

Moreover, if the first condition is not satisfied (S111-B-N), or if the first condition is satisfied (S111-B-Y) and the second condition is not satisfied (S112-B-N), the rear wheel steering ECU 140 may determine that the stick-slip has not occurred (S115-B).

Meanwhile, although it is shown in FIG. 7 to determine whether the conditions are satisfied in the sequence of the first condition, the second condition, and the third condition, it is just one example, and according to embodiments, it is possible to determine whether the first to third conditions are satisfied according to a predetermined sequence of "the first condition", "the third condition", and "the second condition", for example.

Figure 8:
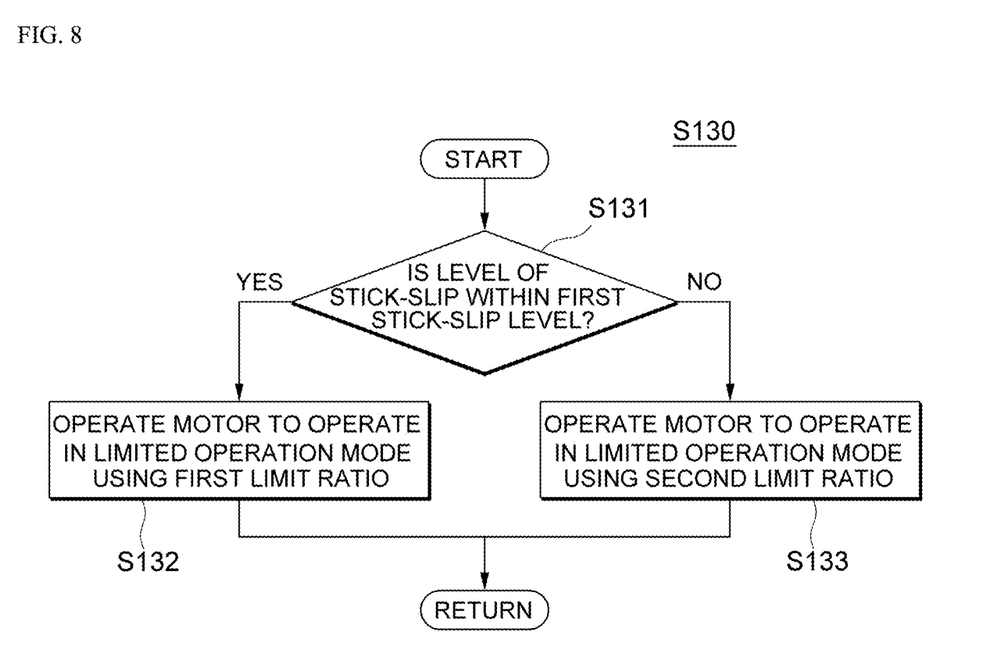
FIG. 8 is a flowchart illustrating an example of controlling a motor in the event of stick-slip as shown in FIG. 5.

FIG. 8 is a flowchart illustrating an example of controlling a motor in the event of stick-slip as shown in FIG. 5.

Referring to FIG. 8, if the level of stick-slip is within a first stick-slip level (S131-Y), the rear wheel steering ECU 140 may operate the motor 110 to operate in a limited operation mode using a first limit ratio (S132).

On the contrary, if the level of stick-slip is not within the first stick-slip level (S131-N), that is, if the level of stick-slip is within a second stick-slip level, the rear wheel steering ECU 140 may operate the motor 110 to operate in a limited operation mode using a second limit ratio (S133).

Figure 9:
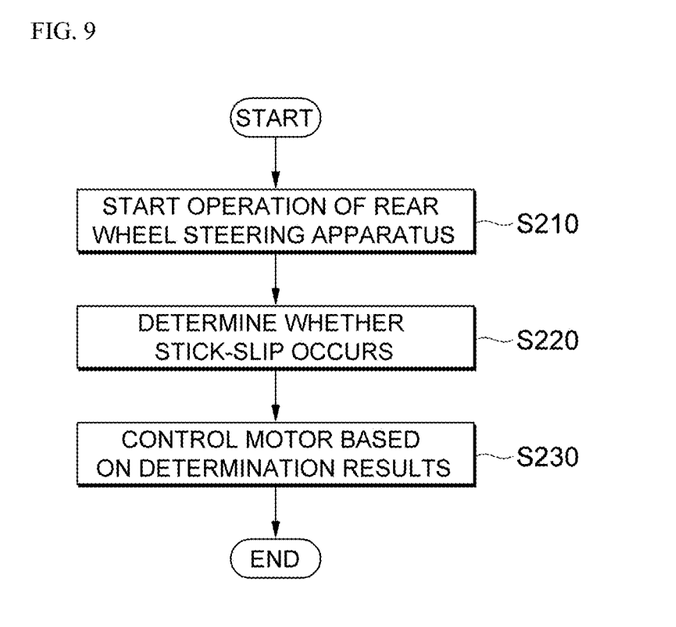
FIG. 9 is a flowchart illustrating an example of a time point at which a stick-slip detection operation is performed according to one exemplary embodiment of the present disclosure.
Figure 10:
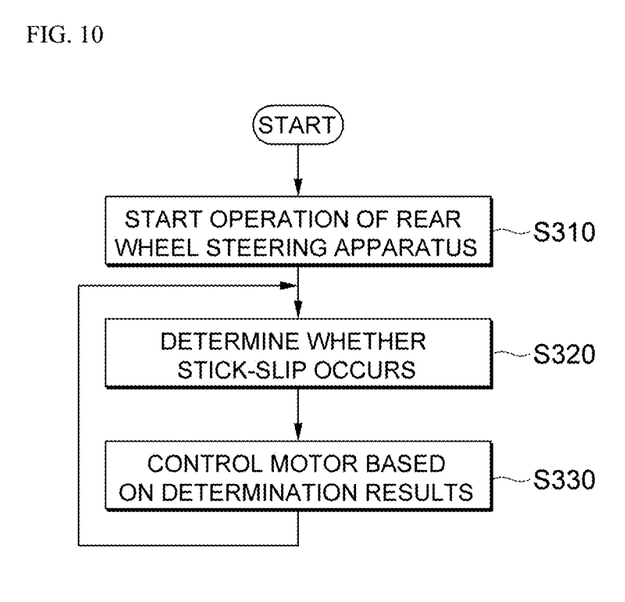
FIG. 10 is a flowchart illustrating another example of a time point at which a stick-slip detection operation is performed according to one exemplary embodiment of the present disclosure.

FIG. 9 is a flowchart illustrating an example of a time point at which a stick-slip detection operation is performed according to one exemplary embodiment of the present disclosure, and FIG. 10 is a flowchart illustrating another example of a time point at which a stick-slip detection operation is performed according to one exemplary embodiment of the present disclosure.

When the operation of the rear wheel steering apparatus 100 starts (S210), the rear wheel steering ECU 140 may perform the stick-slip detection operation, which includes the operation of determining whether stick-slip occurs (S220) and the operation of controlling the motor to operate in either a limited operation mode or a normal operation mode based on the determination results (S230) as shown in FIG. 9, only once.

Of course, when the operation of the rear wheel steering apparatus 100 starts (S310), the rear wheel steering ECU 140 may continuously perform the stick-slip detection operation, which includes an operation of determining whether stick-slip occurs (S320) and the operation of controlling the motor to operate in either a limited operation mode or a normal operation mode based on the determination results (S330) as shown in FIG. 10.

Meanwhile, it has been described that the control performance is lowered using a predetermined limit ratio if the stick-slip has occurred, but according to embodiments, it is possible to control the rear wheel steering rail 30 to move to a target movement distance based on a command after a predetermined time delay without using the limit ratio, or to divide the target movement distance based on the command into a plurality of predetermined sub-movement distances and control the rear wheel steering rail 30 to move to each of the plurality of sub-movement distances.

Although all the components constituting the embodiments of the present disclosure have been described as being combined into one or being operated in a combined state, the present disclosure is not essentially limited to the embodiments. That is, all the components may be selectively combined and operated as one or more components within the scope of the present disclosure. In addition, although all the components may be implemented respectively as independent hardware, some or all of the components may be selectively combined and implemented as a computer program having a program module performing some or all functions combined in one or more pieces of hardware.

Moreover, the computer program may be stored in computer-readable media, such as a universal serial bus (USB) memory, a compact disk (CD), and a flash memory, and read and executed by a computer to implement the embodiments of the present disclosure. The storage media of the computer program may include a magnetic recording medium, an optical recording medium, etc.

The above description is merely illustrative of the technical idea of the present disclosure, and various modifications, changes, and substitutions may be made thereto by those skilled in the art without departing from the essential characteristics of the present disclosure. Therefore, the embodiments disclosed herein and the accompanying drawings are not intended to limit the technical spirit of the present disclosure, but to illustrate the technical idea of the present disclosure, and the technical spirit of the present disclosure is not limited by these embodiments and the accompanying drawings. The protection scope of the present disclosure should be interpreted by the following claims, and all technical ideas within the scope equivalent thereto should be interpreted as being included in the scope of the present disclosure.

What is claimed is:

1. A rear wheel steering apparatus for controlling a steering angle of rear wheels based on a command received from a vehicle electronic control unit (ECU), the rear wheel steering apparatus comprising:
    a motor for moving a rear wheel steering rail connected to the rear wheels in left and right directions; and
    a rear wheel steering ECU configured to control the motor to move the rear wheel steering rail to a target movement distance based on the command and to determine whether stick-slip occurs based on the target movement distance and an actual movement distance of the rear wheel steering rail.

2. The rear wheel steering apparatus of claim 1, further comprising a linear position sensor for sensing the actual movement distance of the rear wheel steering rail, wherein the rear wheel steering ECU receives the actual movement distance from the linear position sensor.

3. The rear wheel steering apparatus of claim 2, wherein the rear wheel steering ECU determines that the stick-slip has occurred in response to determining that a first condition, in which a difference between the target movement distance and the actual movement distance occurring for a predetermined unit time is equal to or greater than a first predetermined reference distance, is satisfied.

4. The rear wheel steering apparatus of claim 3, wherein the rear wheel steering ECU determines whether the stick-slip occurs by further using at least one of an estimated movement distance obtained based on a rotation angle of the motor or a current output of the motor.

5. The rear wheel steering apparatus of claim 4, further comprising a motor position sensor for sensing the rotation angle of the motor, wherein the rear wheel steering ECU receives the rotation angle from the motor position sensor and obtains the estimated movement distance of the rear wheel rail based on the rotation angle.

6. The rear wheel steering apparatus of claim 5, wherein, in a state where the first condition is satisfied, the rear wheel steering ECU determines that the stick-slip has occurred in response to determining that at least one of a second condition, in which the current output of the motor is equal to or greater than a predetermined reference output when the actual movement distance for the unit time reaches a second predetermined reference distance or more at one go, or a third condition, in which a difference between the estimated movement distance and the actual movement distance is equal to or greater than a third predetermined distance, is satisfied.

7. The rear wheel steering apparatus of claim 6, wherein the rear wheel steering ECU sequentially determines whether the first condition, the second condition, and the third condition are satisfied according to a predetermined sequence, determines that the stick-slip has occurred in response to determining that all the first condition, the second condition, and the third condition are satisfied, and determines that the stick-slip has not occurred in response to determining that any one of the first condition, the second condition, and the third condition is not satisfied.

8. The rear wheel steering apparatus of claim 6, wherein, in response to determining that the stick-slip has occurred, the rear wheel steering ECU controls the motor to operate in a limited operation mode.

9. The rear wheel steering apparatus of claim 8, wherein the rear wheel steering ECU controls the motor to operate in the limited operation mode in which the rear wheel steering rail moves by a limited movement distance obtained based on the target movement distance using a predetermined limit ratio.

10. The rear wheel steering apparatus of claim 9, wherein the rear wheel steering ECU controls the motor to operate in the limited operation mode having different limit ratios depending on a level of the stick-slip that has occurred.

11. The rear wheel steering apparatus of claim 10, wherein, in response to determining that the level of the stick-slip is within a first stick-slip level, at which only one of the second condition and the third condition is satisfied in a state where the first condition is satisfied, the rear wheel steering ECU controls the motor to operate in the limited operation mode in which the rear wheel steering rail moves by a first limited movement distance obtained based on the target movement distance using a first predetermined limit ratio, and wherein, in response to determining that the level of the stick-slip is equal to a second stick-slip level, at which all the first condition, the second condition, and the third condition are satisfied, the rear wheel steering ECU controls the motor to operate in the limited operation mode in which the rear wheel steering rail moves by a second limited movement distance obtained based on the target movement distance using a second predetermined limit ratio having a value lower than the first limit ratio.

12. The rear wheel steering apparatus of claim 8, wherein the rear wheel steering ECU performs an operation of determining whether the stick-slip occurs and an operation of controlling the motor to operate in the limited operation mode only once at a beginning of an operation of the rear wheel steering apparatus, or continuously performs the operation of determining whether the stick-slip occurs and the operation of controlling the motor to operate in the limited operation mode during the operation of the rear wheel steering apparatus.

13. A vehicle comprising a vehicle electronic control unit (ECU) and the rear wheel steering apparatus of claim 1.

14. A control method of a rear wheel steering apparatus, the rear wheel steering apparatus configured to control a steering angle of rear wheels based on a command received from a vehicle electronic control unit (ECU) and comprising: a motor for moving a rear wheel steering rail connected to the rear wheels in left and right directions; and a rear wheel steering ECU for controlling the motor to move the rear wheel steering rail to a target movement distance based on the command, the control method comprising determining, by the rear wheel steering ECU, whether stick-slip occurs based on the target movement distance and an actual movement distance of the rear wheel steering rail.

15. The control method of a rear wheel steering apparatus of claim 14, wherein the determining whether the stick-slip occurs comprises determining whether the stick-slip occurs based on the actual movement distance received from a linear position sensor.

16. The control method of a rear wheel steering apparatus of claim 15, wherein the determining whether the stick-slip occurs comprises determining that the stick-slip has occurred in response to determining that a first condition, in which a difference between the target movement distance and the actual movement distance occurring for a predetermined unit time is equal to or greater than a first predetermined reference distance, is satisfied.

17. The control method of a rear wheel steering apparatus of claim 16, wherein the determining whether the stick-slip occurs comprises determining whether the stick-slip occurs by further using at least one of an estimated movement distance obtained based on a rotation angle of the motor or a current output of the motor.

18. The control method of a rear wheel steering apparatus of claim 17, wherein the determining whether the stick-slip occurs comprises obtaining the estimated movement distance of the rear wheel steering rail based on the rotation angle received from a motor position sensor.

19. The control method of a rear wheel steering apparatus of claim 18, wherein the determining whether the stick-slip occurs comprises determining that the stick-slip has occurred, in a state where the first condition is satisfied, in response to determining that at least one of a second condition, in which the current output of the motor is equal to or greater than a predetermined reference output when the actual movement distance for the unit time reaches a second predetermined reference distance or more at one go, or a third condition, in which a difference between the estimated movement distance and the actual movement distance is equal to or greater than a third predetermined distance, is satisfied.

20. The control method of a rear wheel steering apparatus of claim 19, wherein the determining whether the stick-slip occurs comprises sequentially determining whether the first condition, the second condition, and the third condition are satisfied according to a predetermined sequence, determining that the stick-slip occurs in response to determining that all the first condition, the second condition, and the third condition are satisfied, and determining that the stick-slip has not occurred in response to determining that any one of the first condition, the second condition, and the third condition is not satisfied.

21. The control method of a rear wheel steering apparatus of claim 19, further comprising controlling, by the rear wheel steering ECU, the motor to operate in a limited operation mode in response to determining that the stick-slip has occurred.

22. A non-transitory computer-readable medium storing computer-executable instructions when executed by a processor, causing the processor to perform the control method according to claim 14.

23. A rear wheel steering apparatus for controlling a steering angle of rear wheels based on a command received from a vehicle electronic control unit (ECU), the rear wheel steering apparatus comprising:

a motor for moving a rear wheel steering rail connected to the rear wheels in left and right directions; and a rear wheel steering ECU configured to:
determine whether stick-slip occurs based on a target movement distance and an actual movement distance of the rear wheel steering rail, and
control the motor to operate in a limited operation mode, in which the rear wheel steering rail moves by a limited movement distance smaller than the target movement distance, in response to determining that the stick-slip has occurred.

24. The rear wheel steering apparatus of claim 23, wherein the rear wheel steering ECU is further configured to control the motor to operate in a normal operation mode, in which the rear wheel steering rail moves by the target movement distance based on the command received from the vehicle ECU, in response to determining that the stick-slip has not occurred.

25. The rear wheel steering apparatus of claim 23, wherein the limited movement distance is determined by the target movement distance multiplied by a predetermined limit ratio.

26. The rear wheel steering apparatus of claim 25, wherein the rear wheel steering ECU controls the motor to operate in the limited operation mode having different limit ratios depending on a level of the stick-slip that has occurred.

* * * * *